Sept. 20, 1938. R. WIDERÖE 2,130,573
THREE-PHASE POWER DIRECTION INDICATING MEANS
Filed May 18, 1935 3 Sheets-Sheet 1
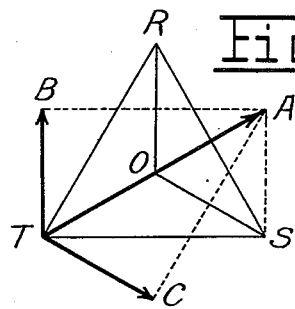
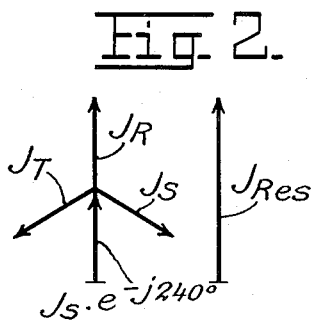
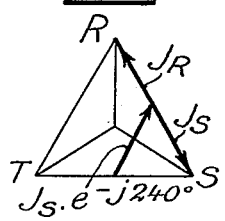
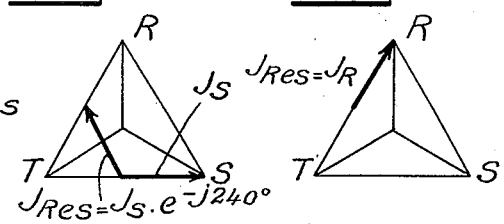
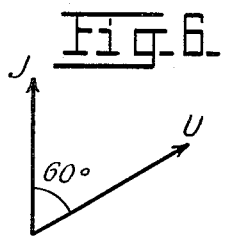
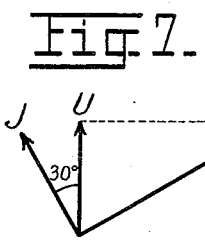
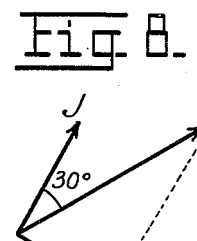
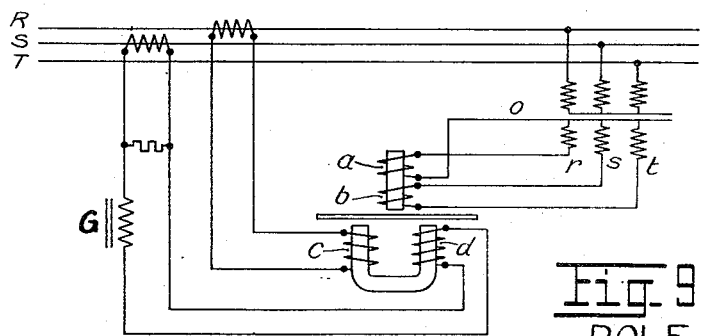
INVENTOR
ROLF WIDERÖE
BY Haseltine, Lake & Co. ATTORNEYS Sept. 20, 1938.   R. WIDERÖE   2,130,573
THREE-PHASE POWER DIRECTION INDICATING MEANS
Filed May 18, 1935   3 Sheets-Sheet 2
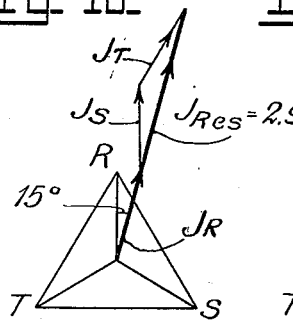
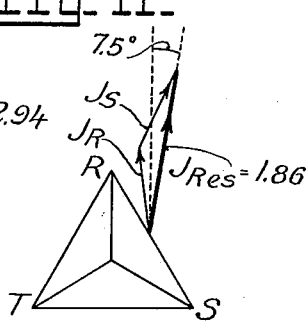
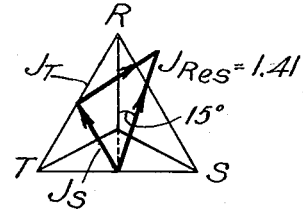
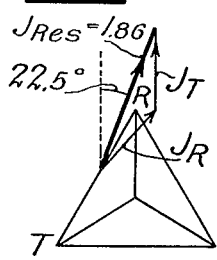
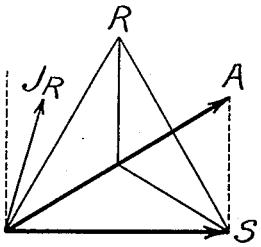
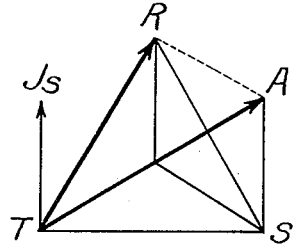
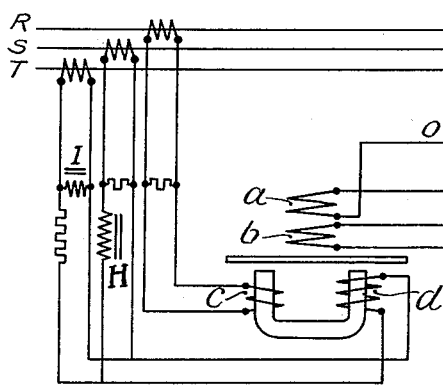
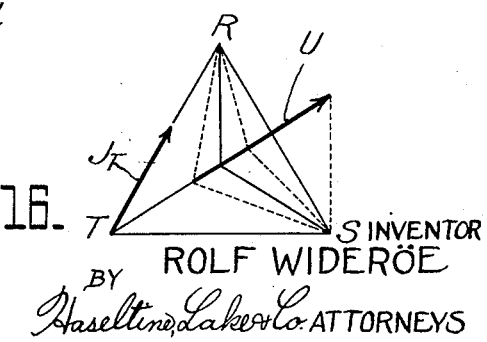
INVENTOR
ROLF WIDERÖE
BY Haseltine, Lake & Co. ATTORNEYS Sept. 20, 1938.  R. WIDERÖE  2,130,573
THREE-PHASE POWER DIRECTION INDICATING MEANS
Filed May 18, 1935   3 Sheets-Sheet 3

INVENTOR
ROLF C WIDERÖE
BY Haseltine Lake & Co. ATTORNEYS

Patented Sept. 20, 1938

2,130,573

UNITED STATES PATENT OFFICE 2,130,573

THREE-PHASE POWER DIRECTION INDICATING MEANS

Rolf Wideröe, Vestre Aker, near Oslo, Norway

Application May 18, 1935, Serial No. 22,222
In Germany May 19, 1934

13 Claims. (Cl. 172—245)

The present invention relates to certain indicator means for three-phase electrical systems, and the main object of the invention is to indicate the power direction in such an electrical three-phase system, especially in case of short circuit, by means of a single wattmetrical element. This indication is obtained by vectorial addition of certain electrical currents and voltages in the three-phase system, being the resultant values of the currents and voltages supplied to the wattmetrical element.

In the following, some various means for carrying the invention into effect are to be described.

Referring now to the accompanying drawings forming part hereof.

Fig. 1 is a vector diagram of the extreme angles and the star and delta voltages in a typical three-phase system.

Fig. 2 is a diagram showing the current vectors corresponding to a short circuit between the three phases when the short circuit contains ohmic resistance.

Fig. 3 is a diagram showing the positions of the vectors in a modified short circuit.

Figs. 4 and 5 are similar diagrams showing the positions of the vectors corresponding to respectively different short circuits.

Figs. 6, 7 and 8 diagrammatically illustrate the mutual positions of the resulting current and potential vectors in the three cases of short circuit, that is of Figs. 3, 4 and 5.

Fig. 9 illustrates the arrangement of the connections of a relay adapted for an electrical system without grounded zero-point.

Fig. 10 is a vector diagram indicating a three-phase short circuit wherein the resulting current has a 15° lag in relation to one of the phases.

Fig. 11 is a similar diagram when a short circuit of one of the delta currents occurs with a resulting current lag of 7.5° relative to the direction of one of the star voltages.

Figs. 12 and 13 are vector diagrams illustrating respectively different short circuits of other delta voltages.

Fig. 14 is a vector diagram involving a star short circuit while Fig. 15 is a similar diagram involving another star short circuit.

Fig. 16 illustrates a short circuit of the third star voltage with resulting potential vector.

Fig. 17 diagrammatically illustrates the arrangement of connections of a relay adapted for use with a three-phase system when the zero-point of said system is grounded.

Figure 18:
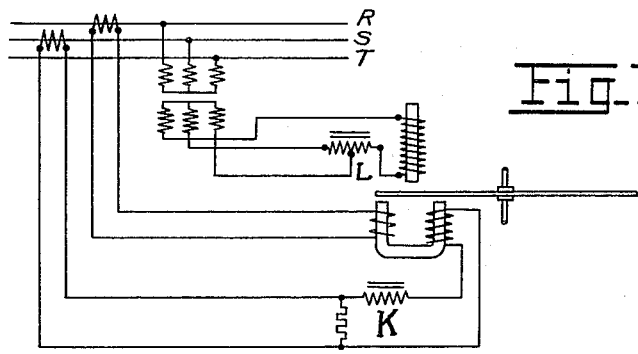

Fig. 18 is a modification of the connection of the potential coil of the relay.

Figure 19:
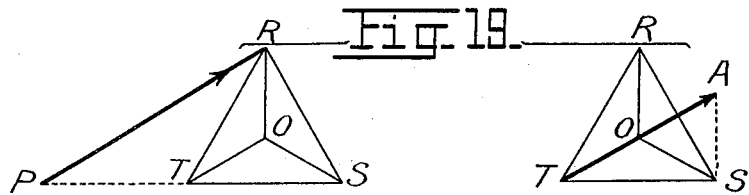
Figure 20:
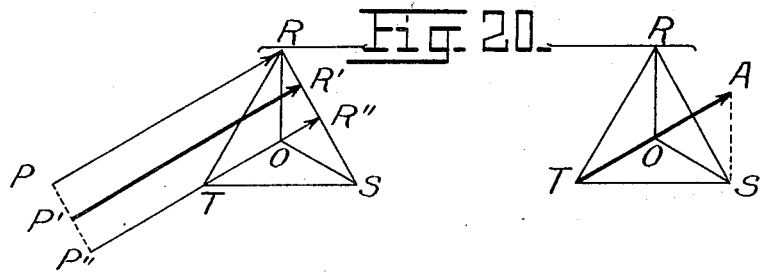
Figure 21:
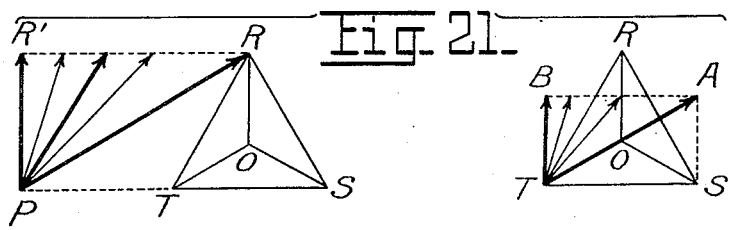
Figure 22:
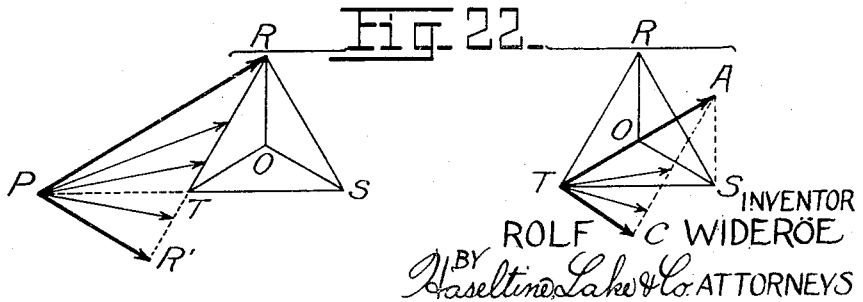

Figs. 19 and 20 are vector diagrams for the voltages obtained in different cases of short circuit according to the relay diagram of Fig. 18 while Figs. 21 and 22 are additional vector diagrams with still other short circuits indicated.

Figure 9 shows the arrangement of connections of a wattmetrical element or relay suitable for use in an electrical network with an ungrounded zero-point. Figure 17 shows the arrangement of a relay used when the zero-point of the three-phase system is connected to earth. Figure 18 shows a modification of the connection of the potential coil of the relay. The remaining figures show a number of vector diagrams illustrating the manner of operation of the relay under the different conditions in case of short circuit.

The potential coil of the relay according to Figures 9 and 17 is supplied with the vectorial sum TA of a delta voltage in the three-phase system and the star voltage OT, which is perpendicular to said delta voltage when the three-phase system is free from any effective short circuits (see Fig. 1). In the vector diagram of Figure 1 OR, OS AND OT indicate the three star voltages, while RS, TS and RT indicate the delta voltages of a typical three-phase system. The relay is supplied, for instance, with the vectorial sum TA of the voltages TS and OR. This resultant voltage always will have the same value and direction TA in case of short circuit between the phases R and S. When a short circuit occurs between the three phases the direction of the resultant voltage will remain constant. The value of said voltage, however, in this case will vary. By short circuit ST the resultant voltage will vary in such a manner that the extreme point of the vector is displaced from A to B dependent on the value of the short circuit voltage between S and T. By short circuit between the phases T and R the extreme point of the resultant voltage vector is displaced from A to C dependent on the remaining short circuit voltage TR. The resultant voltage vector, therefore, always will be situated within the angle between the vectors TB and TC.

As above said the arrangement of connections of the relay as shown in Figure 9 especially is adapted for indicating the direction of power in case of short circuit in a three-phase system, the zero point of which is not connected to earth or which is connected to earth through a high impedance. The resultant current, supplied to the wattmetrical element, in this case is produced by currents in phases R and S, which act with an equal number of ampere-turns. The last mentioned current is reversed and given a phase displacement of 60 degrees lagging in relation to its original direction. Consequently, the resultant current is expressed by the equation:

$$J_{Res} = J_R + J_S \cdot e^{-j\,240°}$$

In order to describe the manner of action of the relay as simply as possible the following is provided; that the short circuit only contains ohmical resistance, thereby consequently the current and the voltage in the short circuit have the same phase angle. Then the resultant current vectors will have the position shown in Figure 2 corresponding to a short circuit between the three phases. Figure 3 shows the positions of the vectors in case of a short circuits RS. As it will be seen the resultant vector has the same direction as caused by a short circuit between the three phases. Figures 4 and 5 show the positions of the vectors corresponding to a short circuit ST and TR respectively.

Figures 6, 7 and 8 show the mutual position of the resultant current and potential vectors in the last mentioned three cases of short circuit. By means of these diagrams the phase-conditions can easily be seen, which will give a positive indication on the wattmetrical element. This will be the case when the phase displacement of the current in the short circuit has a value within certain limits. In the Table 1 the phase angles of the short circuit impedance are shown, for which the wattmetrical element will give a positive indication. The first part of the table relates to an ordinary short circuit, where the relay is operated by current flowing through both phases to the place of the fault. The second part of the table relates to a double earth fault, the relay in this case being operated only by the one of the currents going to the place of the fault. The impedance of the short circuit always being inductive, only the phase angles between 0 and 90 degrees will be of practical importance. The minus signifies capacitive current.

In connection with all two phase short circuits the indication of the wattmetrical element is independent of the magnitude of the remaining short circuit voltage. Even if the short circuit takes place near the relay and therefore the short circuit voltage practically equals zero, the relay will give a distinct indication. With such a two phase short circuit, consequently, there will be no part of the conductors, where the indication of the relay is indistinct. With a three phase short circuit this of course cannot be avoided. The resultant voltage, however, is twice as high as the phase voltage and the resultant current twice as great as the current in a single phase. Consequently, the wattmetrical element will give four times the power of a wattmeter, the coils of which are energized by star voltage and phase current, and 2.31 times the power of a wattmeter supplied with delta voltage and phase current. The part of the line where the relay will be inactive therefore will be correspondingly reduced.

As shown in Figure 9, the principle described can be brought into effect for instance by means of a wattmeter operating according to the Ferraris-principle as used in the usual kilowatt-hour-meters. A wattmeter of this type has the advantage that it is very easy to arrange more current and potential coils. In Fig. 9 the potential coil $a$ is supplied with the star voltage R, while the potential coil $b$ is supplied with the delta voltage ST. The current coil $c$ is supplied with current directly from the R-phase (without any artificial phase displacement), while the current coil $d$ is supplied with the current from the S-phase, which current is given an opposite direction and besides a lagging in phase of 60 degrees in respect to its original direction. Owing to the resistance in parallel to the phase current transformer in the S-phase the phase current in the $d$-coil will be smaller than in the $c$-coil and the $d$-coil therefore is wound with more turns. The impedance G in the circuit of coil $d$ serves to shift the phase in said coil to the desired extent.

A power direction relay of the type here de-

Table 1

| Short circuit | RST | RS | ST | TR |
|---|---|---|---|---|
| Phase displacement for which the short circuit impedance causes a positive indication. | −30° to +150° | −30° to +150° | 0° to +120° | 0° to +120° |

| | | | | | | |
|---|---|---|---|---|---|---|
| Double earth fault | RS | RS | ST | ST | TR | TR |
| | R-current | S-current | S-current | T-current | T-current | R-current |
| Phase displacement for which the short circuit impedance causes a positive indication. | 0° to +180° | −60° to +60° | 0° to +120° | | | 0° to +120° |

In order to obtain an absolutely reliable operation of the relay also when the short circuit has a very small phase displacement it may be sufficient to give the resultant current vector a further phase displacement, for instance, of 15 degrees lagging. This will have the effect, that all angle spaces in the Table 1 are reduced by 15 degrees.

Although not shown in both Figs. 9 and 17, it is evident that a double earth fault with current in the T-phase will not cause any indication. This fact, however, is only an unessential drawback, which in most cases will not be of any importance.

scribed can, of course, also be used for indicating the power direction when the three-phase system is free from any effective short circuits. In this case the phase displacement can vary from +180° to −180°, and in order to get a positive indication in all cases where this shall be obtained (namely from +90° to −90°) the resultant current vector must be given a further phase displacement of 60 degrees. With short circuits RST and RS the positive angle space then will go from −90° to +90°, with short circuits ST and TR from −60° to +60°.

The connections shown in Figure 17 are especially suitable for indicating the direction of power in a three phase system, the zero-point of which is directly connected to earth, so that provisions also have to be made for single-phase short circuits. The connections according to Figure 17 will also give correct indications in all cases of double earth connection. The connections of the potential circuit are the same as in the first example. In this case, however, the currents from all three phases with an equal number of ampere-turns are added together with the following phase displacements in respect to the original direction of the current vectors:

$J_R$: 15° lagging $J_S$: 240° lagging (reversion of the current and 60° lagging)

$J_T$: 210° leading, or 150° lagging (reversion of the current and 30° leading).

A three-phase short circuit in this case corresponds to the vector diagram shown in Figure 10. The resultant current has 15° lagging phase in relation to the R-current. Figure 11 shows the conditions when a short circuit RS takes place. The resultant current in this case will have a lagging phase of 7.5° in relation to the direction of the star voltage OR under normal conditions. Figures 12 and 13 show the vector diagrams for the short circuits ST and TR respectively.

The Table 2 shows in the same manner as Table 1 the conditions for obtaining a positive indication when the last described connections of the relay are used.

gram for the R-short circuit. The resultant potential vector in this case will have a position between the vectors TA and TS dependent of the value of the short circuit voltage. The angle space for positive indication of the relay in this case extends from −15 to +135 degrees. Figure 15 shows the conditions with an S-short circuit. The resultant voltage has a position between TA and TR, and the positive angle space extends from −30 to +120 degrees. By short circuit in the T-phase the resultant voltage, as shown in the vector diagram of Figure 16, will retain its direction and only be smaller than when the three-phase system is free from any effective short circuits. The resultant voltage, however, never will be reduced to zero, and the positive angle space extends from −60° to +120°. Thus it will be seen that with all single-phase short circuits the relay will operate in a very reliable manner and within sufficient angular distance limits, where the direction of indication is uncertain.

As shown in Figure 17 the connection of the potential circuit is equal to that shown in Figure 9. The wattmeter is provided with two current coils, the one of which, the coil C, is supplied with current from the phase R with a lagging of 15 degrees, while the coil $d$ is supplied with current from the S- and T-phases with a lagging of 240 degrees and a leading of 210 degrees respectively. According to Figure 17 these two currents are supplied to the coil $d$ in such a manner, that the two currents will flow in the same coil, the cur-

Table 2

| Short circuit | RST | RS | ST | TR |
|---|---|---|---|---|
| Angle space for positive indication | −45 to +135° | −37.5° to +142.5° | −45° to +75° | +7.5° to +127.5° |

| Double earth fault | RS | RS | ST | ST | TR | TR |
|---|---|---|---|---|---|---|
|  | JR | JS | JS | JT | JT | JR |
| Angle space for positive indication. | −15° to +165° | −60° to +120° | 0° to +120° | −90° to +30° | +30° to +150° | −15° to +105° |

This table contains some cases of short circuit and double earth connection, in which the angle space for positive indication seems to be too small, as the limits are situated between 0 and 90 degrees (the underlined values). The two underlined short circuits ST and TR, however, have no importance, being obtained only when the short circuit voltage equals zero. This very rarely takes place and is quite impossible of occurrence when the phase displacement is 75 or 7.5 degrees.

For the two underlined double earth connections ST and TR the case is the same. Also here the limit values 90° and +30 degrees correspond to that case, in which the short circuit voltage equals zero. This, however, is for a double earth connection quite impossible. The comparatively small angle spaces for double earth faults also for other reasons are without any essential importance. The inductance of the circuit: conductor—earth—conductor has namely the effect, that the short circuit impedance will have a nearly constant phase displacement, as a rule between +40 and +60 degrees.

In conclusion the operation of the relay by single-phase short circuit (or earth fault) shall be described. Figure 14 shows the vector diarents thus being galvanically added, in contrast to the magnetic addition of the current vectors taking place between the coils C and $d$. Owing to the fact that the impedance of the current coils as a rule will be less than 10% of the impedance of the choke coils at H and I and the resistances, the galvanic connection between the coils will not cause any difficulties.

By means of the connection of the potential circuit of the watt-meter hitherto shown and described the zero-point of the voltage transformer is made accessible. This, however, is not always the case, and instead of using an artificial zero-point, a connection as shown in Figure 18 can be used. The potential coil of the wattmeter here is connected with the phase R and an autotransformer L, which is energized by the voltage ST and produces a potential P, this potential being symmetrical with the potential S in relation to the point T. It will be seen that the voltage PR, which is the indicated voltage produced by the connections of Figure 18, will always have the same direction and always be proportional to the resultant voltage TA of the star voltage OR and the delta voltage TS. The variable impedance L and impedance K serve to control the phase shifting in the system. The voltage PR always will be 50% greater than the voltage TA. This is shown in the Figures 19, 20, 21 and 22, which are vector diagrams for the voltages in different cases of short circuits.

Having now fully shown and described my invention, I claim:

1. In combination with a three phase power system an indicating system adapted to be responsive to indicate the direction of power flow particularly in case of abnormal load conditions such as a short circuit; which indicating system comprises a number of current transformers associated with at least two phases of the three phase system, potential transformers for each one of the three phases, which transformers have a common neutral point; means for effecting a relative phase displacement between said current transformers whereby there results an additive summation of the respective currents; a wattmetrical device having a wattmetrical element, and having current coils corresponding to and adapted individually to be responsive to respective current transformers in a manner to be susceptible and responsive to the phase displacing effect of said phase displacement means, and also having potential coils adapted individually to be responsive to respective potential transformers such as mentioned above; and connections between the potential coils on the one hand and the potential transformer secondaries on the other hand and means whereby there is impressed upon the wattmetrical element the resultant voltage from the phase voltage between the first phase and neutral and the phase voltage between the second and the third phase, and whereby said second-third phase voltage is opposed in phase to said first phase-neutral voltage.

2. An indicating system according to claim 1, in which the current phase displacement is brought about by a relative reversal of one of the current transformers involved and in addition to a phase displacement of 60 degrees lagging relative to its original direction.

3. An indicating system according to claim 1, in which the phase displacement is brought about by a relative reversal of one of the current transformers involved and in addition to a phase displacement of 60 degrees lagging relative to its original direction, and by furthermore causing a resulting current phase-displacement of 15 degrees of the resulting current.

4. An indicating system according to claim 1, in which the phase displacement is brought about by a relative reversal of one of the current transformers involved and in addition to a phase displacement of 60 degrees lagging relative to its original direction, and by furthermore causing in addition thereto a phase displacement of 60 degrees of the resulting current.

5. An indicating system according to claim 1, in which there are provided three current transformers, that is, one for each phase, and in which a resulting current from all three phase currents is obtained by vectorial addition thereof to energize the current coils of the wattmetrical element, whereby each of these currents is displaced, the first phase current being displaced 15 degrees lagging relative to its original position, the second phase 240 degrees lagging relative to its original position, and the third phase 210 degrees leading relative to its original position, and whereby there results an additive summation of the thus displaced phase currents.

6. An indicating system according to claim 1, in which at least two current transformers energize different coils of the wattmetric element, and are coordinated in such a way as to produce a common magnetic flux.

7. An indicating system according to claim 1, in which the wattmetrical element operates according to the Ferraris-principle.

8. In combination with a three phase power system, an indicating system adapted to be responsive to indicate the direction of power flow, and particularly in case of abnormal load conditions such as a short circuit, which indicating system comprises a number of current transformers associated with at least two phases of the three phase system, potential transformers transforming the three phase voltages to a smaller value and avoiding any phase displacement or change in the relative magnitude of the three phase voltages, a wattmetrical device having a wattmetrical element, means for effecting a relative phase displacement between the currents from the current transformers and the currents flowing to the wattmetrical element, said wattmetrical device having current coils corresponding to, and adapted individually to be responsive to, respective current transformers in a manner to be susceptible and responsive to the phase displacing effect of said phase displacement means, so as to cause an additive summation of the respective currents to result, and the wattmetrical element also having potential coils adapted individually to be responsive to respective potential transformers such as the aforesaid potential transformers, and connections between the potential coils on the one hand and the potential transformer secondaries on the other hand and other potential means capable of impressing upon the wattmetrical element a resulting voltage which is always of the same relative magnitude and always has a phase displacement opposed to the voltage between the neutral and the third phase voltage of said potential transformer means.

9. An indicating system according to claim 8, in which the resulting voltage energizing the voltage coil of the wattmetrical element is always 3-times the magnitude of the opposed third phase voltage being obtained by an additive summation of the phase voltage between neutral and the first phase of the potential transformer means and the line voltage between the second and the third phase of the potential transformer means, said voltage lagging 90 degrees behind said neutral first phase voltage.

10. An indicating system according to claim 8, in which the resulting voltage energizing the voltage coil of the wattmetrical element is always 3-times the magnitude of the opposed third phase voltage being obtained by an auto-transformer means connected with its end winding to the second phase voltage of the potential transformer means, to the third phase voltage with an intermediate point on the auto-transformer-winding and to the voltage coil of the wattmetrical element with its other end winding whereby the other end winding of said potential coil is connected to the first phase voltage of the potential transformer means.

11. In combination with a three phase alternating current system an indicating system adapted to be responsive to indicate the direction of power flow particularly in case of abnormal load conditions such as a short circuit; which indicating system comprises current transformers for each one of at least two phases of the three phase system; potential transformer means for each one of the three phases, which transformer means have a neutral point; means adapted to effect a relative phase displacement between said current transformers whereby an additive summation of the respective currents results; a wattmetrical device having a wattmetrical element, also having current coils corresponding to and adapted individually to be responsive to respective current transformers, and having potential windings; and a potential circuit system operatively associated with the potential windings of said wattmetrical device, and which comprises the secondaries of said potential transformers, and a potential magnitude changing device, in which circuit system a resultant voltage from the secondaries is impressed upon said potential windings of the wattmetrical device, which resultant voltage is composed of phase voltage between the second and third phase and phase voltage between the first and second phase, and in which the voltage changing device operates to maintain magnitudes and phase angles of the voltages involved proportionately the same under all possible operating conditions.

12. An indicating system according to claim 11, in which the potential changing device effects a phase shifting of one of the component voltages of 180 degrees.

13. An indicating system according to claim 11, in which the potential magnitude changing device comprises an auto-transformer, and in which the potential windings of the wattmetrical element are connected to the first phase voltage of the potential transformer means and the end of the auto-transformer winding, the other end of the auto-transformer winding being connected to the second phase voltage of the potential transformer means, and an intermediate point of the auto-transformer winding being connected to the third phase voltage of the potential transformer means.

ROLF WIDERÖE.